US012698404B2

(12) United States Patent
Knoote et al.

(10) Patent No.: US 12,698,404 B2
(45) Date of Patent: Aug. 4, 2026

(54) METHOD FOR PROVIDING AN AQUEOUS COMPOSITION WITH RETROREFLECTIVE PROPERTIES

(71) Applicant: Ink Invent IP B.V., Nieuwegein (NL)

(72) Inventors: Jacques Arthur Knoote, Zoetermeer (NL); Paul Willem Mijnen, Utrecht (NL); Harald Paul Kerres, Zoetermeer (NL); Philippus Jacob Muis, Andel (NL); Menno Arthur Knoote, Hellevoetsluis (NL)

(73) Assignee: Ink Invent IP B.V., Nieuwegein (NL)

( * ) Notice: Subject to any disclaimer, the term of this patent is extended or adjusted under 35 U.S.C. 154(b) by 1015 days.

(21) Appl. No.: 17/800,537

(22) PCT Filed: Feb. 24, 2021

(86) PCT No.: PCT/EP2021/054527
§ 371 (c)(1),
(2) Date: Aug. 18, 2022

(87) PCT Pub. No.: WO2021/170634
PCT Pub. Date: Sep. 2, 2021

(65) Prior Publication Data
US 2023/0121891 A1 Apr. 20, 2023

(30) Foreign Application Priority Data
Feb. 25, 2020 (EP) .................................... 20159262

(51) Int. Cl.
*C09D 5/33* (2006.01)
*C09D 7/43* (2018.01)
(Continued)

(52) U.S. Cl.
CPC ............... *C09D 5/004* (2013.01); *C09D 7/43* (2018.01); *C09D 7/61* (2018.01); *C09D 17/001* (2013.01)

(58) Field of Classification Search
CPC . C09D 5/004; C09D 7/43; C09D 7/61; C09D 17/001; C09D 7/69; C09D 7/70; C08K 3/40; C08K 7/20
See application file for complete search history.

(56) References Cited

U.S. PATENT DOCUMENTS

2004/0157960 A1 8/2004 Rowe
2007/0071954 A1 * 3/2007 Sagar .................... C09D 11/02 428/313.5

FOREIGN PATENT DOCUMENTS

JP 2002167541 A 6/2002
TW 201932882 A 8/2019
WO WO-0116223 A1 * 3/2001 ............ C09D 11/03

* cited by examiner

*Primary Examiner* — Amber R Orlando
*Assistant Examiner* — Jeffrey Eugene Barzach
(74) *Attorney, Agent, or Firm* — DINSMORE & SHOHL LLP

(57) ABSTRACT

The invention relates to a method for providing a composition selected from the group consisting of aqueous pastes, inks, paints and coating formulations with retroreflective properties, said method comprising the steps of:

a) providing an aqueous paste, ink, paint or coating formulation without retroreflective properties, said aqueous paste, ink, paint or coating formulation having a viscosity $\eta_1$ of between 0.25 and 1000 Pa·s at a shear rate of 0.01 $s^{-1}$;
b) providing an aqueous pseudoplastic gel composition comprising a thickener;
c) admixing the aqueous ink, paint or coating formulation provided in step (a) with the aqueous pseudoplastic gel (Continued)

composition provided in step (b) in a weight ratio of between 30:70 to 70:30; and d) admixing the mixture obtained in step (c) with 0-2 wt. %, based on the total weight of the aqueous paste, ink, paint or coating formulation with retroreflective properties, of a thickener.

20 Claims, 2 Drawing Sheets

(51) Int. Cl.
*C09D 7/61* (2018.01)
*C09D 17/00* (2006.01)

METHOD FOR PROVIDING AN AQUEOUS COMPOSITION WITH RETROREFLECTIVE PROPERTIES

FIELD OF THE INVENTION

The invention relates to a method for providing a composition selected from the group consisting of aqueous pastes, inks, paints and coating formulations with retroreflective properties. The invention further relates to said method further comprising the step of applying the retroreflective composition to a substrate.

BACKGROUND OF THE INVENTION

Retroreflective effects are used in a variety of applications. For example to improve the visibility of road signs, road markers, textiles, cars, et cetera, under dark conditions, or simply to improve their visual appearance. Road markers are typically provided with retroreflective properties by adding spherical glass beads having a specific refractive index. Retroreflection occurs by the tandem action of refraction of the incident light through the upper surface of a spherical glass bead, internal reflection from the lower onside surface of the spherical glass bead and subsequent refraction of the light as it exits the upper surface of the spherical glass bead, travelling back to the direction from which the impinging light came.

WO00/42113A1 concerns retroreflective inks comprising microbeads in a liquid carrier medium. The liquid carrier medium can be water. The inks are intended for screen printing.

WO2004/017104A2 discloses retroreflective compositions comprising retroreflective microspheres, a binder system and a thixotropic blend comprising at least two thixotropic agents in an amount of from about 2 to about 5 wt. %, based on the retroreflective composition. The composition can comprise water. The retroreflective compositions are intended to be used as paints, inks and coatings and are applied to a substrate using aerosols applicators with a propellant.

Aqueous pastes, paints, inks and coating formulations are commercially offered by many suppliers in different colours and/or tailored for different applications. Every new application and every modification of an aqueous paste, paint, ink or coating formulation requires a costly and time-consuming development process, from lab sample to commercial product. Obviously, offering many products in different colours and/or for different applications requires a big warehouse and large stockpiles to be able to quickly respond to customer orders.

As outlined supra, adding retroreflective properties to pastes, paints, inks and coating formulations may be advantageous because it results in an improved visibility and/or a more appealing visual appearance. Developing retroreflective versions of already commercially available aqueous pastes, paints, inks and coating formulations also requires a costly and time-consuming development process, because adding additional components, including retroreflective spherical glass beads, should not adversely affect the processability of the already existing paste, paint, ink or coating formulation, let alone the properties of the paste, paint, ink or coating formulation after drying or curing. Offering retroreflective pastes, paints, inks and coating formulations, in addition to pastes, paints, inks and coating formulations without retroreflective properties, requires even a bigger warehouse.

Accordingly, there is a need for an efficient method to provide, on demand, aqueous pastes, paints, inks and coating formulations, i.e. commercially available aqueous pastes, paints, inks and coating formulations, with retroreflective properties without substantially changing the processability of the aqueous paints, inks and coating formulations and without adversely affecting the properties of the paste, paint, ink or coating formulation after drying or curing.

The inventors have established that providing aqueous pastes, paints, inks and coating formulations having a viscosity of between 0.25 and 1000 Pa·s at a shear rate of 0.01 $s^{-1}$ as measured with a rheometer with a plate-plate geometry and a gap distance of 0.5 mm at a temperature of 25° C., with retroreflective properties cannot be implemented by simply mixing the aqueous paste, paint, ink or coating formulation with retroreflective spherical glass beads, because this results in inhomogeneity, air inclusion and/or instability as regards the distribution of the spherical glass beads across the composition.

It is therefore an object of the present invention to provide an efficient method for providing aqueous pastes, paints, inks and coating formulations with retroreflective properties without substantially changing the processability of the aqueous pastes paints, inks and coating formulations and without adversely affecting the properties of the paste, paint, ink or coating formulation after drying or curing.

It is a further object of the present invention to provide an efficient method for providing aqueous pastes, paints, inks and coating formulations with retroreflective spherical glass beads resulting in a homogeneous and storage stable distribution of the retroreflective spherical glass beads across the composition.

SUMMARY OF THE INVENTION

The inventors have unexpectedly established that one or more of the objectives can be met by admixing the aqueous paste, paint, ink or coating formulation without retroreflective properties with an aqueous pseudoplastic gel composition comprising retroreflective spherical glass beads and a specific thickener, said aqueous pseudoplastic gel composition having a first viscosity at a shear rate of 0.01 $s^{-1}$ of between 5 and 250 Pa·s and a second viscosity at a shear rate of 100 $s^{-1}$ that is between 10 and 1000 times lower than the first viscosity, and by optionally subsequently adding additional thickener.

Accordingly, in a first aspect, the invention concerns a method for providing a composition selected from the group consisting of aqueous pastes, inks, paints and coating formulations with retroreflective properties, said method comprising the steps of:

a) providing an aqueous paste, ink, paint or coating formulation without retroreflective properties, said aqueous paste, ink, paint or coating formulation having a viscosity $\eta_1$ of between 0.25 and 1000 Pa·s at a shear rate of 0.01 $s^{-1}$;

b) providing an aqueous pseudoplastic gel composition having a first viscosity $\eta_2$ at a shear rate of 0.01 $s^{-1}$ of between 5 and 250 Pa·s and a second viscosity $\eta_3$ at a shear rate of 100 $s^{-1}$ that is between 10 and 1000 times lower than the first viscosity $\eta_2$, wherein the aqueous pseudoplastic gel consists of, based on the total weight of the aqueous pseudoplastic gel composition:

15-39.85 wt. % of water;

60-80 wt. % of spherical glass beads having a median particle diameter D50, as measured with laser diffraction, between 5 and 1500 μm, preferably between 20 and 150 μm, and a refractive index, measured at a wavelength λ of 589 nm, between 1.8 and 2.8, wherein optionally at least part of the spherical glass beads are hemispherically coated with a light-reflective coating;

0.15-2.50 wt. % of a thickener; and 0-5 wt. % of one or more further ingredients;

c) admixing the aqueous paste, ink, paint or coating formulation provided in step (a) with the aqueous pseudoplastic gel composition provided in step (b) in a weight ratio of between 30:70 to 70:30; and d) admixing the mixture obtained in step (c) with 0-2 wt. %, based on the total weight of the aqueous paste, ink, paint or coating formulation with retroreflective properties, of a thickener, to provide an aqueous paste, ink, paint or coating formulation with retroreflective properties, wherein the viscosities $\eta_1$, $\eta_2$ and $\eta_3$ are measured with a rheometer with a plate-plate geometry and a gap distance of 0.5 mm at a temperature of 25° C.

The aqueous pseudoplastic gel composition mainly consists of water and spherical glass beads. The inert spherical glass beads do not or hardly influence the aqueous paste, ink, paint or coating formulation. As such, these systems are highly compatible with aqueous paste, ink, paint or coating formulations. Water disappears from the paste, ink, paint or coating formulation with drying or curing. The inventors have established that the processability of the aqueous pastes, paints, inks and coating formulations is hardly changed when the aqueous pseudoplastic gel composition is added in suitable amounts. Since the retroreflective spherical glass beads are added in the form of a stable and homogeneous aqueous pseudoplastic gel composition, they can be added to the aqueous paste, ink, paint or coating formulation (without retroreflective properties) without air inclusion, resulting in a stable and homogeneous aqueous paste, ink, paint or coating formulation with retroreflective properties.

Definitions

The term 'pseudoplastic gel' as used herein relates to gels that exhibit shear thinning behaviour and that have no yield point.

The term 'shear thinning behaviour' in the context of the pseudoplastic gel of the present invention relates to a reduction of the viscosity when the pseudoplastic gel, initially being in a static situation, is subjected to a shear rate.

The term 'tan(δ)', wherein S is the phase shift, is defined by the ratio G"/G', as is commonly known in the field of rheology. G" represent the loss modulus and characterizes the viscous character or the liquid-like behaviour of the sample. G' represents the storage modulus and characterizes the elastic character or the solid-like behaviour of the sample. If a sample shows purely viscous behaviour and there is no elastic behaviour, δ=90°, G'=0 and tan(δ)=∞. If a sample shows purely elastic behaviour and there is no viscous behaviour, δ=0°, G"=0 and tan(δ)=0. If the sample has a non-zero phase shift δ of lower than 45°, tan(δ) is lower than 1, G' is larger than G" and the sample shows gel-like behaviour in the sense that elastic behaviour dominates viscous behaviour.

DETAILED DESCRIPTION

Figure 1:
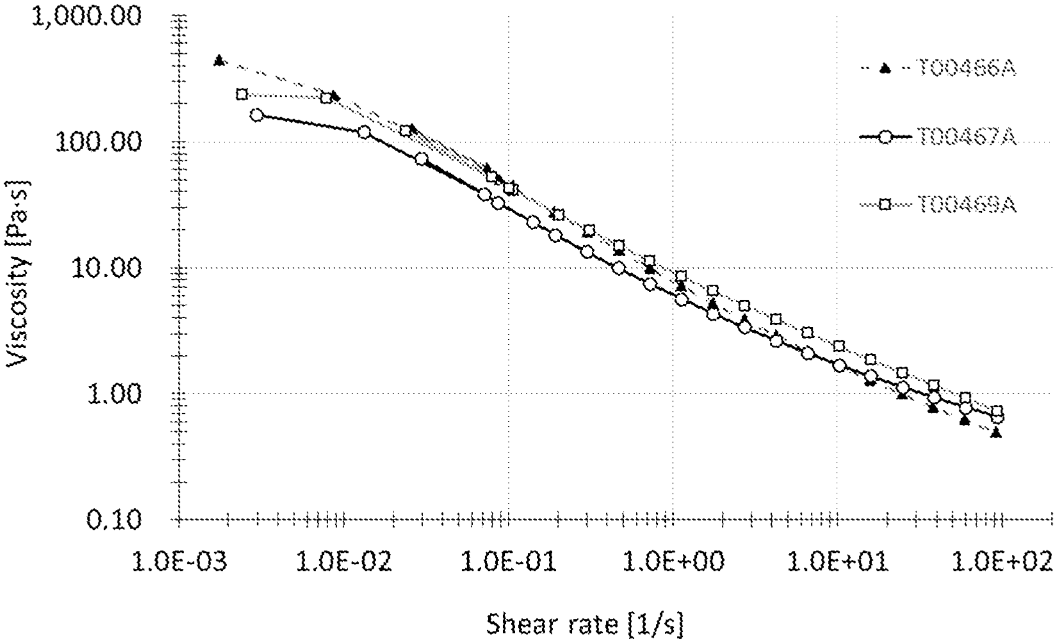
FIG. 1 depicts viscosity versus shear rate profiles of aqueous pseudoplastic gel compositions as used in the process according to the invention.

In a first aspect, the invention concerns a method for providing a composition selected from the group consisting of aqueous pastes, inks, paints and coating formulations with retroreflective properties, said method comprising the steps of:

a) providing an aqueous paste, ink, paint or coating formulation without retroreflective properties, said aqueous paste, ink, paint or coating formulation having a viscosity $\eta_1$ of between 0.25 and 1000 Pa·s at a shear rate of 0.01 $s^{-1}$;

b) providing an aqueous pseudoplastic gel composition having a first viscosity $\eta_2$ at a shear rate of 0.01 $s^{-1}$ of between 5 and 250 Pa·s and a second viscosity $\eta_3$ at a shear rate of 100 $s^{-1}$ that is between 10 and 1000 times lower than the first viscosity $\eta_2$, wherein the aqueous pseudoplastic gel consists of, based on the total weight of the aqueous pseudoplastic gel composition:

15-39.85 wt. % of water;

60-80 wt. % of spherical glass beads having a median particle diameter D50, as measured with laser diffraction, between 5 and 1500 μm, preferably between 20 and 150 μm, and a refractive index, measured at a wavelength λ of 589 nm, between 1.8 and 2.8, wherein optionally at least part of the spherical glass beads are hemispherically coated with a light-reflective coating;

0.15-2.50 wt. % of a thickener; and 0-5 wt. % of one or more further ingredients;

c) admixing the aqueous paste, ink, paint or coating formulation provided in step (a) with the aqueous pseudoplastic gel composition provided in step (b) in a weight ratio of between 30:70 to 70:30; and d) admixing the mixture obtained in step (c) with 0-2 wt. %, based on the total weight of the aqueous paste, ink, paint or coating formulation with retroreflective properties, of a thickener, to provide an aqueous paste, ink, paint or coating formulation with retroreflective properties, wherein the viscosities $\eta_1$, $\eta_2$, and $\eta_3$ are measured with a rheometer with a plate-plate geometry and a gap distance of 0.5 mm at a temperature of 25° C.

In preferred embodiments, the aqueous pseudoplastic gel composition provided in step (b) is stable for at least 1 day, more preferably at least 2 days, at least 5 days, at least 10 days, at least 1 month, at least 2 months, at least 6 months, at least 1 year, at least 2 years, wherein the composition is considered stable if upon visual and tactile inspection no sedimentation, no syneresis and no separation can be observed.

In other preferred embodiments, the aqueous paste, ink, paint or coating formulation with retroreflective properties obtained in step (d) is stable and homogeneous for at least 1 day, more preferably at least 2 days, at least 5 days, at least 10 days, at least 1 month, at least 2 months, at least 6 months, at least 1 year, at least 2 years, wherein the composition is considered stable and homogeneous if upon visual and tactile inspection no sedimentation, no syneresis and no separation can be observed and wherein upon inspection with a microscopic camera, no air inclusion can be visually observed.

In preferred embodiments, the aqueous paste, ink, paint or coating formulation without retroreflective properties provided in step (a) has a viscosity $\eta_1$ of between 0.25 and 900 Pa·s, between 0.25 and 800 Pa·s, between 0.25 and 700 Pa·s, between 0.25 and 600 Pa·s, between 0.25 and 500 Pa·s, between 0.25 and 400 Pa·s, or between 0.25 and 300 Pa·s, at a shear rate of 0.01 $s^{-1}$, wherein the viscosity is measured with a rheometer with a plate-plate geometry and a gap distance of 0.5 mm at a temperature of 25° C.

In other preferred embodiments, the aqueous paste, ink, paint or coating formulation without retroreflective properties provided in step (a) has a viscosity $\eta_1$ of between 1 and 1000 Pa s, between 10 and 1000 Pa·s, between 100 and 1000 Pa·s, between 150 and 1000 Pa·s, between 200 and 1000 Pa·s, or between 250 and 1000 Pa·s, at a shear rate of 0.01 $s^{-1}$, wherein the viscosity is measured with a rheometer with a plate-plate geometry and a gap distance of 0.5 mm at a temperature of 25° C.

In step (c), the aqueous paste, ink, paint or coating formulation provided in step (a) is preferably admixed with the aqueous pseudoplastic gel composition provided in step (b) in a weight ratio of between 60:40 to 40:60, more preferably in a weight ratio of between 45:55 to 55:45.

In preferred embodiments, the method as defined herein further comprises the step of applying the aqueous paste, ink, paint or coating formulation with retroreflective properties obtained in step (d) to a substrate using screen printing, spray coating or spray painting.

In a preferred embodiment, steps (c) and (d) are performed at a temperature between 15 and 30° C., preferably for a period of at least 5 minutes.

Spherical Glass Beads

As defined hereinbefore, the refractive index of the spherical glass beads, measured at a wavelength $\lambda$ of 589 nm, is between 1.8 and 2.8.

In preferred embodiments, the term 'glass' in 'spherical glass beads' as used herein refers to non-crystalline, amorphous solid and transparent material made of oxides. In other embodiments, the term 'glass' in 'spherical glass beads' refers to solid and transparent material made of oxides and containing some crystallinity. The refractive index of the spherical glass beads is closely related to the density of the glass, although the relationship is not linear. Because of the nature of glass, the density is approximately an additive function of its composition. Densities of spherical glass beads having refractive indices between 1.5 and 2.8 typically vary between 2.5 and 4.5 g/$cm^3$.

Oxides that can be used in glass are oxides of silicon, boron, aluminium, sodium, barium, vanadium, titanium, lanthanum, strontium, zirconium, potassium, magnesium, iron, calcium, zinc, lithium, barium and lead. The spherical glass beads can for example comprise different combinations of silica ($SiO_2$), boric oxide ($B_2O_3$), phosphorous pentoxide ($P_2O_5$), vanadium pentoxide ($V_2O_5$), arsenic trioxide ($As_2O_3$), germanium oxide ($GeO_2$), calcium oxide (CaO), sodium oxide ($Na_2O$), magnesium oxide (MgO), zinc oxide (ZnO), aluminium oxide ($Al_2O_3$), potassium oxide ($K_2O$), iron oxide ($Fe_2O_3$), lead oxide (PbO), barium oxide (BaO), barium titanate ($BaTiO_3$), titanium oxide ($TiO_2$), lithium oxide ($Li_2O$), strontium oxide (SrO), lanthanum oxide ($La_2O_3$), and zirconium oxide ($ZrO_2$). Silica and boric oxide are generally the lowest in density. Glasses containing large weight percentages of these oxide therefore generally result in glass beads with low refractive indices. The refractive indices can be increased by adding oxides with higher molecular weights.

Preferably, the spherical glass beads do not comprise PbO.

Glass beads having refractive indices in the range of 1.5-2.51 and their composition in terms of oxides are disclosed in WO2014/109564A1, which is incorporated herein by reference in its entirety. PbO-free transparent glass beads with refractive indices of above 2.15 are disclosed in U.S. Pat. No. 4,082,427, which is incorporated herein by reference in its entirety.

The spherical glass beads may be coloured spherical glass beads as long as they remain transparent. Both coloured spherical glass beads made from coloured transparent glass and spherical glass beads provided with a concentric transparent coloured coating are encompassed by the invention. The colour may be the natural colour caused by the composition of the oxides or may be deliberately chosen by adding ingredients having a specific colour. Coloured glass beads having high refractive indices and high transparency are disclosed in WO2014/109564A1.

Accordingly, in an embodiment, at least part of the spherical glass beads are spherical glass beads made from coloured transparent glass and/or at least part of the spherical glass beads is provided with a concentric transparent coloured coating.

The spherical glass beads have a median particle diameter D50, as measured with laser diffraction. Accordingly, the median particle diameter D50 is a volume median, based on a volume distribution. The median particle diameter D50 is the diameter where half of the population of spherical glass beads lies below. This volume median particle diameter is often referred to in the art as Dv50 or $D_{v0.5}$.

In a preferred embodiment, the spherical glass beads have a median particle diameter D50, as measured with laser diffraction, between 25 and 100 μm, preferably between 30 and 75 μm, more preferably between 35 and 50 μm.

In another preferred embodiment, the spherical glass beads have a median particle diameter D50, as measured with laser diffraction, between 5 and 100 μm, such as between 5 and 75 μm, between 5 and 50 μm, between 5 and 45 μm, between 5 and 40 μm or between 5 and 35 μm.

In another embodiment, the spherical glass beads have a median particle diameter D50, as measured with laser diffraction, between 5 and 1400 μm, such as between 5 and 1200 μm, between 5 and 1000 μm, between 5 and 800 μm, between 5 and 500 μm or between 5 and 300 μm.

In yet another preferred embodiment, the spherical glass beads have a median particle diameter D50, as measured with laser diffraction, between 25 and 150 μm, such as between 50 and 150 μm, between 75 and 150 μm, between 100 and 150 μm, between 110 and 150 μm or between 115 and 150 μm.

The diameters D10 and D90 are often referred to in the art as Dv10 or $D_{v0.1\ and\ Dv}$90 or $D_{v0.9}$, respectively. The D10 diameter is the diameter where 10% of the population of spherical glass beads lies below. Similarly, the D90 diameter is the diameter where 90% of the population of spherical glass beads lies below.

The span, as measured by laser diffraction, of the particle size distribution of the spherical glass beads is defined by:

$$\text{span} = \frac{D90 - D10}{D50}$$

In still further preferred embodiments, the spherical glass beads have a median particle diameter D50, as measured with laser diffraction, between 25 and 100 μm and a span between 0 and 1, preferably between 0 and 0.7, more preferably between 0 and 0.5, still more preferably between 0 and 0.2, even more preferably between 0 and 0.1. In a more preferred embodiment, 20 the spherical glass beads have a median particle diameter D50, as measured with laser diffraction, between 30 and 75 μm and a span between 0 and 1, preferably between 0 and 0.7, more preferably between 0 and 0.5, still more preferably between 0 and 0.2, even more preferably between 0 and 0.1. In a still more preferred embodiment, the spherical glass beads have a median particle diameter D50, as measured with laser diffraction, between 35 and 50 m and a span between 0 and 1, preferably between 0 and 0.7, more preferably between 0 and 0.5, still more preferably between 0 and 0.2, even more preferably between 0 and 0.1.

In another more preferred embodiment, the spherical glass beads have a median particle diameter D50, as measured with laser diffraction, between 5 and 35 μm and a span between 0 and 2, such as between 0 and 1.8, between 0 and 1.5, between 0 and 1.25 and between 0 and 1, or such as between 0.5 and 2, between 1 and 2 and between 1.25 and 2.

In another still more preferred embodiment, the spherical glass beads have a median particle diameter D50, as measured with laser diffraction, between 10 and 25 μm and a span between 0 and 2, such as between 0 and 1.8, between 0 and 1.5, between 0 and 1.25 and between 0 and 1, or such as between 0.5 and 2, between 1 and 2 and between 1.25 and 2.

As will be appreciated by those skilled in the art, span=0 corresponds to monodisperse spherical glass beads.

In a preferred embodiment, at least part of the spherical glass beads are hemispherically coated with a light-reflective coating. An example is a hemispherical aluminium coating. Although this is possible, it is not essential to provide the effects as described herein. Accordingly, in an embodiment, the spherical glass beads are not hemispherically coated with a light-reflective coating. In another embodiment, at least part of the spherical glass beads is silane coated. In another embodiment, at least part of the spherical glass beads is silicone coated.

In a preferred embodiment, the amount of the spherical glass beads is 60-78 wt. %, more preferably 61-76 wt. %, even more preferably 62-74 wt. %, based on the total weight of the aqueous pseudoplastic gel composition provided in step (b).

In embodiments, the amount of the spherical glass beads is 60-78 wt. %, 60-76 wt. %, 60-74 wt. %, 60-72 wt. %, 60-70 wt. %, 60-68 wt. %, or 60-66 wt. %, based on the total weight of the aqueous pseudoplastic gel composition.

In other embodiments, the amount spherical glass beads is 62-80 wt. %, 64-80 wt. %, 66-80 wt. %, 68-80 wt. %, 70-80 wt. %, 72-80 wt. %, 74-80 wt. %, or 76-80 wt. %, based on the total weight of the aqueous pseudoplastic gel composition.

In a preferred embodiment, the aqueous pseudoplastic gel composition as provided in step (b) comprises spherical glass beads having a refractive index, measured at a wavelength λ of 589 nm, between 1.9 and 2.6, more preferably between 1.9 and 2.2.

In another embodiment, the aqueous pseudoplastic gel composition as provided in step (b) comprises at least two types of spherical glass beads, wherein at least one type of spherical glass beads has a refractive index, measured at a wavelength λ of 589 nm, between 1.8 and lower than 2.0 and at least one further type of spherical glass beads has a refractive index, measured at a wavelength λ of 589 nm, between 2.0 and 2.8.

Thickener

The aqueous pseudoplastic gel composition provided in step (b) comprises a thickener. This can be the same thickener that is applied in step (d). In embodiments, the thickener applied in step (d) is the same thickener applied in the aqueous pseudoplastic gel composition provided in step (b). In other embodiments, the thickener applied in step (d) is different from the thickener applied in the aqueous pseudoplastic gel composition provided in step (b).

Without wishing to be bound by any theory, it is believed that the thickener limits or prevents settling and/or sedimentation of the spherical glass beads and optionally of further particulate matter in the aqueous pseudoplastic gel composition and in the final aqueous pastes, inks, paints or coating formulations with retroreflective properties. Moreover, again without wishing to be bound by any theory, it is believed that the thickener provides the aqueous gel composition provided in step (b) with shear-thinning behaviour.

In embodiments, the thickener in the aqueous pseudoplastic gel composition provided in step (b) and/or the thickener applied in step (d) encompasses mixtures of different thickeners. In preferred embodiments, the thickener in the aqueous pseudoplastic gel composition provided in step (b) consists of a single thickener. In preferred embodiments, the thickener applied in step (d) consists of a single thickener.

One preferred group of thickeners are ASE polymers (Alkali Swellable Emulsion; these polymers are produced using emulsion polymerization). ASE polymers are based on a balance of hydrophilic (meth)acrylic acid monomers and hydrophobic (meth)acrylate ester monomers and can be supplied at high volume solids in liquid form. ASE polymers rely on a change from low to high pH (neutralization) to trigger thickening. The 'trigger' is built into the polymer by creating an approximately 50:50 ratio of (meth)acrylic acid, which is soluble in water, and a (meth)acrylate ester, which is not soluble in water. When the acid is un-neutralized (low pH), the polymer is insoluble in water and does not thicken. When the acid is fully neutralized (high pH), the polymer becomes soluble and thickens. ASE polymers are supplied at low pH (<5) and maintain a low as-supplied viscosity (<100 cP) at solids of up to 35%. When subject to a pH of about 7 or higher, ASE polymers solubilize, swell, and thicken the composition through volume exclusion. The degree of thickening can be related to the molecular weight of the polymer. Because their performance depends on water absorption and swelling, ASE polymers tend to be very high in molecular weight, which allows them to thicken efficiently. The rheology profiles ASE polymers create are typically steeply shear-thinning (pseudoplastic), and thus ASE polymers are well suited to build high viscosity at very low shear rates.

In an embodiment, the hydrophilic monomers of the ASE polymer are chosen from the group consisting of (meth) acrylic acid, maleic acid and combinations thereof.

In another embodiment, the hydrophobic monomers of the ASE polymer are chosen from the group consisting of the esters of (meth)acrylic acid with $C_1$- to $C_4$-alcohols, in particular of ethyl acrylate, butyl acrylate, and methyl methacrylate.

In still another preferred embodiment, the hydrophilic monomers of the ASE polymer are chosen from the group consisting of (meth)acrylic acid, maleic acid and combinations thereof and the hydrophobic monomers of the ASE polymer are chosen from the group consisting of the esters of (meth)acrylic acid with $C_1$- to $C_4$-alcohols, in particular ethyl acrylate, butyl acrylate, and methyl methacrylate.

In an embodiment, the ASE polymer is a copolymer consisting of 10-90 wt. %, based on the weight of the ASE polymer, of repeating units based on one or more hydrophilic monomers A and 10-90 wt. % of repeating units based on one or more hydrophobic monomers B, wherein the amounts of the monomers A and B add up to 100 wt %.

(A)

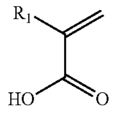

(B)

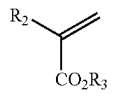

wherein $R_1$ and $R_2$ are independently hydrogen or methyl and wherein $R_3$ is $C_1$- to $C_4$-alkyl.

Another preferred group of thickeners are HASE polymers (Hydrophobically-modified Alkali Swellable Emulsion, these polymers are produced using emulsion polymerization). HASE polymers are copolymers that build on the ASE polymer chemistry by adding one or more hydrophobic associative monomers, such as an acrylic ester and/or vinyl ester monomer, to the ASE polymer composition. HASE polymers retain the pH dependent behaviour of their ASE counterparts, but in addition to absorbing water, HASE polymers also thicken via hydrophobic association. This mechanism is known as associative thickening (i.e. associating with any hydrophobic moiety in the composition).

The hydrophilic and hydrophobic monomers of the HASE polymers can be the same as described with respect to the ASE polymers. Preferred hydrophobic associative monomers are (meth)acrylic ester monomers of (meth)acrylic acid and $C_8$-$C_{22}$-alcohols and/or vinyl ester monomers of (substituted) vinyl alcohols and $C_8$-$C_{22}$-alkyl acids. In another preferred embodiment, the one or more hydrophobic associative monomers are selected from the group consisting of steareth-20 methacrylate, beheneth-25 methacrylate, vinyl neodecanoate, and combinations thereof.

In an embodiment, the HASE polymer is a copolymer consisting of 10-90 wt. %, based on the weight of the HASE polymer, of repeating units based on one or more hydrophilic monomers A as defined hereinbefore, 10-90 wt. % of repeating units based on one or more hydrophobic monomers B as defined hereinbefore, and 0.01 to 2 wt. % of repeating units based on one or more hydrophobic associative monomers C and/or D, wherein the amounts of the monomers A, B, C and D add up to 100 wt %:

(C)

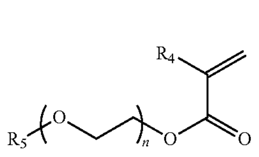

(D)

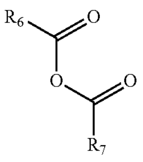

wherein $R_4$ is hydrogen or methyl, wherein $R_5$ is $C_8$- to $C_{22}$-alkyl, wherein n is an integer from 0 to 50, wherein $R_6$ is hydrogen or methyl and wherein $R_7$ is $C_8$- to $C_{22}$-alkyl.

Yet another preferred group of thickeners are Hydrophobically-modified Ethoxylated URethane (HEUR) polymers. Unlike ASE or HASE-type thickeners, HEUR polymers are non-ionic and soluble at any pH. This solubility is due to the polymer's ethylene oxide backbone, which is water soluble and makes up the majority of the polymer structure. Thus, HEUR polymers require a hydrophobic moiety in the composition to interact with the ethylene oxide backbone to impart structure.

Examples of ASE polymers include Rheovis® 1125 (available from BASF Corporation), ACULYN™ 33; ACULYN™ 38, ACUSOL™ 810A, ACUSOL™ 830, ACUSOL™ 835, ACUSOL™ 842 (all available from DOW Chemical), and Carbopol® Aqua 30 polymer (from Lubrizol Corporation).

Examples of HASE polymers include ACULYN™ Excel, ACRYSOL™ TT615, ACULYN™ 22; ACULYN™ 88, ACUSOL™ 801S, ACUSOL™ 805S, ACUSOL™ 820 and ACUSOL™ 823 (all available from DOW Chemical).

Examples of HEUR polymers include ACUSOL™ 880, ACUSOL™ 882, ACULYN™ 44 and ACULYN™ 46N (all available from DOW Chemical).

In yet another embodiment, the thickener is selected from the group consisting of acrylates crosspolymers, crosslinked polyacrylic acid polymers and crosslinked polyacrylic acid copolymers, particularly from the Carbopol® Polymer products from Lubrizol Corporation, such as Carbopol® AQUA SF-1 Polymer, Carbopol® AQUA SF-1 OS Polymer and Carbopol® Aqua SF-3 Polymer.

In still another embodiment, the thickener is selected from the group consisting of liquid acrylic crosslinked or copolymer dispersions.

In yet another embodiment, the thickener is chosen from non-ionic aqueous emulsions of a modified ethylene vinyl acetate copolymer wax, such as Aquatix 8421, available from BYK.

In yet another embodiment, the thickener is chosen from modified urea or urea-modified polyamides, such as Rheobyk-420, available from BYK.

In an embodiment, the thickener is chosen from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, modified urea or urea-modified polyamides, and combinations thereof.

In another embodiment, the thickener is chosen from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, and combinations thereof.

In another embodiment, the thickener is chosen from the group consisting of ASE polymers, HASE polymers, HEUR polymers, liquid acrylic crosslinked or copolymer dispersions, crosslinked polyacrylic acid polymers, crosslinked polyacrylic acid copolymers, and combinations thereof.

In yet another embodiment, the thickener is selected from the group consisting of ASE polymers, HASE polymers, and combinations thereof. In an embodiment, the thickener is selected from the group consisting of ASE polymers, and combinations thereof. In another embodiment, the thickener is selected from the group consisting of HASE polymers, and combinations thereof.

In a preferred embodiment, the amount of the thickener in the aqueous pseudoplastic gel composition provided in step (b) is 0.20-2.45 wt. %, more preferably 0.40-2.25 wt. %, even more preferably 0.75-2.10 wt. %, based on the total weight of the aqueous pseudoplastic gel composition.

In embodiments, the amount of the thickener is 0.15-2.45 wt. %, 0.15-2.25 wt. %, 0.15-2.1 wt. %, 0.15-1.9 wt. %, 0.15-1.7 wt. %, 0.15-1.5 wt. %, 0.15-1.4 wt. %, or 0.15-1.3 wt. %, based on the total weight of the aqueous pseudoplastic gel composition.

In other embodiments, the amount of the thickener is 0.20-2.5 wt. %, 0.25-2.5 wt. %, 0.30-2.5 wt. %, 0.35-2.5 wt. %, 0.40-2.5 wt. %, 0.45-2.5 wt. %, 0.50-2.5 wt. %, 0.55-2.5 wt. %, 0.60-2.5 wt. %, 0.65-2.5 wt. %, 0.70-2.5 wt. %, 0.75-2.5 wt. %, or 0.80-2.5 wt. %, based on the total weight of the aqueous pseudoplastic gel composition.

The amount of water in the aqueous pseudoplastic gel composition provided in step (b) is independently specified. If a thickener is applied in the form of for example a dispersion in water, the amount of thickener as defined hereinbefore concerns the dry weight of the thickener.

In a preferred embodiment, the mixture obtained in step (c) is admixed in step (d) with 0-1.9 wt. %, 0-1.8 wt. %, 0-1.7 wt. %, 0-1.6 wt. %, 0-1.5 wt. %, 0-1.4 wt. %, or 0-1.3 wt. %, based on the total weight of the aqueous paste, ink, paint or coating formulation with retroreflective properties, of the thickener.

In another preferred embodiment, the mixture obtained in step (c) is admixed in step (d) with 0.1-2.0 wt. %, 0.2-2.0 wt. %, 0.3-2.0 wt. %, 0.4-2.0 wt. %, or 0.5-2.0 wt. %, based on the total weight of the aqueous paste, ink, paint or coating formulation with retroreflective properties, of the thickener.

In preferred embodiments, the thickener applied in step (d) is chosen from the group consisting of ASE polymers, HASE polymers, HEUR polymers, liquid acrylic cross-linked or copolymer dispersions, acrylates crosspolymers, crosslinked polyacrylic acid polymers, crosslinked poly-acrylic acid copolymers, non-ionic aqueous emulsions of a modified ethylene vinyl acetate copolymer wax, modified urea or urea-modified polyamides, and combinations thereof, as defined hereinbefore.

Further Ingredients

In a preferred embodiment, the one or more further ingredients in the aqueous pseudoplastic gel composition provided in step (b) are chosen from the group consisting of foam control agents, humectants, preservatives, dyes, luminescent agents such as phosphorescent agents and fluorescent agents, pigments, UV-absorbers, neutralizers, binders and resins, mica flake pigments and metal flakes or powders. Preferably, the one or more further ingredients in the aqueous pseudoplastic gel composition provided in step (b) are chosen from the group consisting of foam control agents, preservatives and neutralizers.

Non-limiting examples of humectants that can be used are 2,3-propanediol, ethylene glycol and butylene glycol.

Examples of binders and resins that can be used are water-borne binders and resins, such as aqueous dispersions of binders and resins. In a preferred embodiment, the aqueous pseudoplastic gel composition provided in step (b) does not comprise binders or resins.

Metal flakes or powders can be used as reflective pigments. Examples are aluminium, bronze, copper, gold, silver, tin and nickel flakes, preferably aluminium flakes.

Mica flake pigment can also be used as reflective pigment, such as pearlescent pigments based on mica flakes.

In embodiments, the amount of the one or more further ingredients is 0-4.5 wt. %, 0-4.0 wt. %, 0-3.5 wt. %, 0-3.0 wt. %, 0-2.5 wt. %, 0-2.0 wt. %, 0-1.5 wt. %, 0-1.0 wt. % or 0-0.5. wt. %, based on the total weight of the aqueous pseudoplastic gel composition provided in step (b).

In other embodiments, the amount of the one or more further ingredients is 0.01-5 wt. %, 0.02-5 wt. %, 0.04-5 wt. %, 0.08-5 wt. %, 0.15-5 wt. %, 0.25-5 wt. %, 0.35-5 wt. %, 0.45-5 wt. % or 0.55-5 wt. %, based on the total weight of the aqueous pseudoplastic gel composition.

The amount of water in the aqueous pseudoplastic gel composition provided in step (b) is independently specified. If one or more further ingredients is/are applied in the form or for example a dispersion in water, the amount of the one or more further ingredients defined hereinbefore concerns the dry weight, i.e. the weight without the water, of the of the one or more further ingredients.

Rheological Behaviour

The aqueous gel composition provided in step (b) has pseudoplastic behaviour, meaning that it has shear-thinning behaviour without exhibiting a yield point. This means that the composition is gel-like but still able to flow in a static/stable situation (without shear) and is also gel-like (and able to flow) at increased shear rates. In other words, the aqueous gel composition is gel-like but nevertheless pourable. Moreover, the viscosity decreases when the static/stable situation is perturbed by subjecting the gel to a certain increased shear rate (shear-thinning behaviour).

The aqueous pseudoplastic gel composition provided in step (b) is preferably characterized by tan(δ) values, measured with a rheometer with a plate-plate geometry and a gap distance of 0.5 mm at a temperature of 25° C., that are lower than 1 at oscillatory frequencies between 10 and 0.1 Hz. In preferred embodiments, the tan(δ) values, measured with a rheometer with a plate-plate geometry and a gap distance of 0.5 mm at a temperature of 25° C., are between 0.05 and 0.9, more preferably between 0.1 and 0.8 at oscillatory frequencies between 10 and 0.1 Hz.

As will be appreciated by those skilled in the art, tan(δ) values are measured at suitable shear strains in the linear viscoelastic range.

As defined hereinbefore, the aqueous pseudoplastic gel composition provided in step (b) has a first viscosity $\eta_2$ at a shear rate of 0.01 $s^{-1}$ of between 5 and 250 Pa·s and a second viscosity $\eta_3$ at a shear rate of 100 $s^{-1}$ that is between 10 and 1000 times lower than the first viscosity. In a preferred embodiment, the first viscosity is between 10 and 230 Pa·s, more preferably between 14 and 220 Pa·s, even more preferably between 16 and 210 Pa·s, still more preferably between 18 and 200 Pa·s, yet more preferably between 20 and 190 Pa·s. In another preferred embodiment, the second viscosity is between 0.05 and 3 Pa·s, more preferably between 0.08 and 2 Pa·s, even more preferably between 0.1 and 1.5 Pa·s, still more preferably between 0.12 and 1.2 Pa·s, yet more preferably between 0.15 and 1.0 Pa·s, most preferably between 0.2 and 0.8 Pa·s.

In another embodiment, the aqueous pseudoplastic gel composition provided in step (b) has a first viscosity $\eta_2$ at a shear rate of 0.01 $s^{-1}$ of between 100 and 250 Pa·s and a second viscosity $\eta_3$ at a shear rate of 100 $s^{-1}$ that is between 200 and 600 times lower than the first viscosity.

In another embodiment, the aqueous pseudoplastic gel composition provided in step (b) has a first viscosity $\eta_2$ at a shear rate of 0.01 $s^{-1}$ of between 100 and 250 Pa·s and a second viscosity $\eta_3$ at a shear rate of 100 $s^{-1}$ that is between 0.15 and 1.0 Pa·s, preferably between 0.2 and 0.8 Pa·s.

The gel-structure and the first viscosity $\eta_2$ of the aqueous pseudoplastic gel composition provided in step (b), determined at a shear rate of 0.01 $s^{-1}$, are sufficient to keep the spherical glass beads and optional further particulate materials in suspension for a prolonged period.

The inventors have established that the aqueous pseudoplastic gel compositions as provided in step (b) recover the first viscosity over a relatively short period of time after applying a shear rate of 100 $s^{-1}$ (thixotropy test).

Accordingly, in a preferred embodiment, the aqueous pseudoplastic gel composition as provided in step (b) has a third viscosity $\eta_4$ at a shear rate of 0.1 $s^{-1}$, wherein the aqueous pseudoplastic gel composition regains at least 20%, preferably at least 30%, more preferably at least 50%, still more preferably at least 70% of the value of the third viscosity $\eta_4$ within 10 s, preferably within 5 s, more preferably within 2 s from the reduction of the shear rate in step (iii) of the following process comprising the consecutive steps of (i) subjecting the aqueous pseudoplastic gel composition to a shear rate of 0.1 $s^{-1}$ for at least 30 seconds and measuring the third viscosity $\eta_4$;
(ii) subjecting the aqueous pseudoplastic gel composition to a shear rate of 100 $s^{-1}$ for 30 seconds;
(iii) reducing the shear rate to 0.1 $s^{-1}$; and
(iv) measuring the viscosity of the aqueous pseudoplastic gel composition as a function of time and comparing it to the value of the third viscosity $\eta_4$;

wherein the viscosity is measured with a rheometer with a plate-plate geometry and a gap distance of 0.5 mm at a temperature of 25° C.

The wording 'regaining at least x % of the value of the third viscosity 14 within a certain time' as used in the context of the present invention means that the viscosity actually reaches a value $x \cdot \eta_4/100$ within that time.

This embodiment can also be worded as follows. In a preferred embodiment, the aqueous pseudoplastic gel composition as provided in step (b) has a third viscosity $\eta_4$ at a shear rate of 0.1 $s^{-1}$, wherein the aqueous pseudoplastic gel composition reaches, exhibits or has a fourth viscosity $\eta_5$ of at least 20%, preferably at least 30%, more preferably at least 50%, still more preferably at least 70% of the value of the third viscosity $\eta_4$ within 10 s, preferably within 5 s, more preferably within 2 s from the reduction of the shear rate in step (iii) of the following process comprising the consecutive steps of (i) subjecting the aqueous pseudoplastic gel composition to a shear rate of 0.1 $s^{-1}$ for at least 30 seconds and measuring the third viscosity $\eta_4$;
(ii) subjecting the aqueous pseudoplastic gel composition to a shear rate of 100 $s^{-1}$ for 30 seconds;
(iii) reducing the shear rate to 0.1 $s^{-1}$; and
(iv) measuring a fourth viscosity $\eta_5$ of the aqueous pseudoplastic gel composition as a function of time;

wherein the viscosity is measured with a rheometer with a plate-plate geometry and a gap distance of 0.5 mm at a temperature of 25° C.

In embodiments, the aqueous pseudoplastic gel composition as provided in step (b) regains at least 20%, preferably at least 30%, more preferably at least 50%, even more preferably at least 70%, still more preferably at least 90 wt % of the value of the third viscosity $\eta_4$ within 10 s from the reduction of the shear rate in step (iii).

In embodiments, the aqueous pseudoplastic gel composition as provided in step (b) regains at least 20%, preferably at least 30%, more preferably at least 50% of the value of the third viscosity $\eta_4$ within 5 s from the reduction of the shear rate in step (iii).

In embodiments, the aqueous pseudoplastic gel composition as provided in step (b) regains at least 20%, preferably at least 30% of the value of the third viscosity $\eta_4$ within 2 s from the reduction of the shear rate in step (iii).

As will become apparent from the appended examples, the aqueous pseudoplastic gel compositions as provided in step (b) can regain about 100% of the value of the third viscosity $\eta_4$ after some period of time from the reduction of the shear rate in step (iii).

Process for the Preparation of the Aqueous Pseudoplastic Gel Composition

The aqueous pseudoplastic gel composition provided in step (b) can be prepared as follows. Generally speaking, the ingredients of the aqueous pseudoplastic gel composition can be added in any order. After mixing all ingredients, the composition is preferably stirred or homogenized at a temperature of between 15 and 30° C., preferably for a period of between 5 and 15 minutes. In a preferred embodiment, the thickener is added after mixing water, spherical glass beads and any further ingredients. Stirring or homogenization is preferably performed at low shear rates to avoid the inclusion of air bubbles in the aqueous pseudoplastic gel composition.

As explained hereinbefore, the thickening effect of the thickener may depend on the value of the pH. Accordingly, the process for the preparation of the aqueous pseudoplastic gel composition may comprise a step of adjusting the pH, for example adjusting the pH to a value between 6.0 and 11, such as between 6.5 and 11, between 7.0 and 11, between 6.5 and 9.5, between 7.5 and 10.5, or between 7.4 and 7.9. The pH can suitably be adjusted using diluted NaOH or aminomethyl propanol neutralizers, such as AMP Ultra® PC 2000.

In an embodiment, the aqueous pseudoplastic gel composition as provided in step (b) is prepared using a process comprising the steps of:

(i) adding water, the spherical glass beads as defined hereinbefore, the thickener as defined hereinbefore and the optional one or more further ingredients as defined hereinbefore to a container;
(ii) stirring or homogenizing the mixture obtained in step (i), preferably at a temperature between 15 and 30° C., preferably for a period of between 5 and 15 minutes; and
(iii) optionally adjusting the pH prior to or after step (ii), preferably to a value between 6.0 and 11, more preferably to a value between 6.5 and 11, even more preferably between 7.0 and 11.

In embodiments, the pH in step (iii) is adjusted to a value between 6.5 and 9.5. In other embodiments, the pH in step (iii) is adjusted to a value between 7.5 and 10.5.

Thus, the invention has been described by reference to certain embodiments discussed above. It will be recognized that these embodiments are susceptible to various modifications and alternative forms well known to those of skill in the art.

Furthermore, for a proper understanding of this document and its claims, it is to be understood that the verb 'to comprise' and its conjugations are used in its non-limiting sense to mean that items following the word are included, but items not specifically mentioned are not excluded. In addition, reference to an element by the indefinite article 'a' or 'an' does not exclude the possibility that more than one of the element is present, unless the context clearly requires that there be one and only one of the elements. The indefinite article ‘a’ or ‘an’ thus usually means ‘at least one’.

EXAMPLES

Example 1

Three aqueous pseudoplastic gel compositions were prepared by adding ingredients at ambient temperature (~20° C.) to a container in the following order: (1) demi water, (2) preservative (a further ingredient), (3) spherical glass beads, (4) AMP Ultra PC 2000 (a further ingredient) to adjust the pH, and (5) thickener. The resulting mixtures were stirred during about 10 minutes, again at ambient temperature. The amounts of the different ingredients is listed in Table 1. The following ingredients were used.

Spherical Glass Beads:

SFX 2.2, obtained from Jianxi Sunflex Light Retroreflective Material Co, Ltd., having a refractive index of about 2.2, measured at a wavelength $\lambda$ of 589 nm, having a median particle diameter D50 of 40.37 µm, a D10 diameter of 37.32 µm and a D90 diameter of 44.11 µm, as measured with laser diffraction, and a specific gravity of about 4.5 g/cm$^3$. These spherical glass beads comprise $TiO_2$, BaO, ZnO and CaO.

Further Ingredients

- AMP Ultra PC 2000, obtained from Angus Chemical Company; neutralizer
- Acticide MBL, obtained from Thor; preservative Thickeners

- Carbopol® Aqua SF-1, obtained from Lubrizol, cross-linked acrylate copolymer thickener
- Rheovis® AS 1152, obtained from BASF, ASE thickener
- ACULYN™ Excel, obtained from DOW Chemical, HASE thickener

TABLE 1

| Sample | T00466A | T00467A | T00469A |
|---|---|---|---|
| Ingredients | amount [wt. %] | amount [wt. %] | amount [wt. %] |
| Water | | | |
| Water[1] | 35.27 | 34.84 | 35.18 |
| Spherical glass beads | | | |
| SFX 2.2 | 63.00 | 62.53 | 63.01 |
| Further ingredients[2] | | | |
| Acticide MBL | 0.10 | 0.10 | 0.11 |
| AMP Ultra PC 2000 | 0.48 | 0.47 | 0.48 |
| Subtotal further ingredients[2] | 0.58 | 0.57 | 0.59 |
| Thickener | | | |
| Carbopol ® Aqua SF-1 | 1.15 | | |
| Rheovis ® AS 1152 | | 2.06 | |
| ACULYN ™ Excel | | | 1.23 |
| Subtotal thickener[4] | 1.15 | 2.06 | 1.23 |
| Total composition | 100.00 | 100.00 | 100.00 |

Example 2

Stability of the three aqueous pseudoplastic gel compositions given in Table 1 was measured by visual and tactile inspection of whether the sample shows sedimentation, syneresis or separation (phase or otherwise). A sample is considered stable if upon visual and tactile inspection no sedimentation, no syneresis and no separation can be observed. The pH of the three aqueous pseudoplastic gel compositions directly following synthesis and the stability thereafter are listed in Table 2.

TABLE 2

| Sample | T00466A | T00467A | T00469A |
|---|---|---|---|
| pH | 10.63 | 10.26 | 10.59 |
| Stability | >23 days | >23 days | >23 days |

Example 3

The rheological behaviour of the three aqueous pseudoplastic gel compositions of Example 1 was measured using a Malvern Kinexus Rheometer with a plate-plate geometry (PL40 plate) and a gap distance of 0.5 mm at a temperature of 25.0° C.

A viscosity-versus-shear-rate profile of the three aqueous pseudoplastic gel compositions according to the invention was measured at shear rates varying between about 0.001 $s^{-1}$ and 100 $s^{-1}$ with 10 samples per decade. The viscosity-versus-shear-rate profiles are given in FIG. 1. As can be inferred from FIG. 1, all aqueous pseudoplastic gel compositions show shear-thinning behaviour. The form of the viscosity versus shear rate profile in the limit of zero shear rate suggests that the compositions have no yield point. The three aqueous pseudoplastic gel compositions were all pourable.

Figure 2:
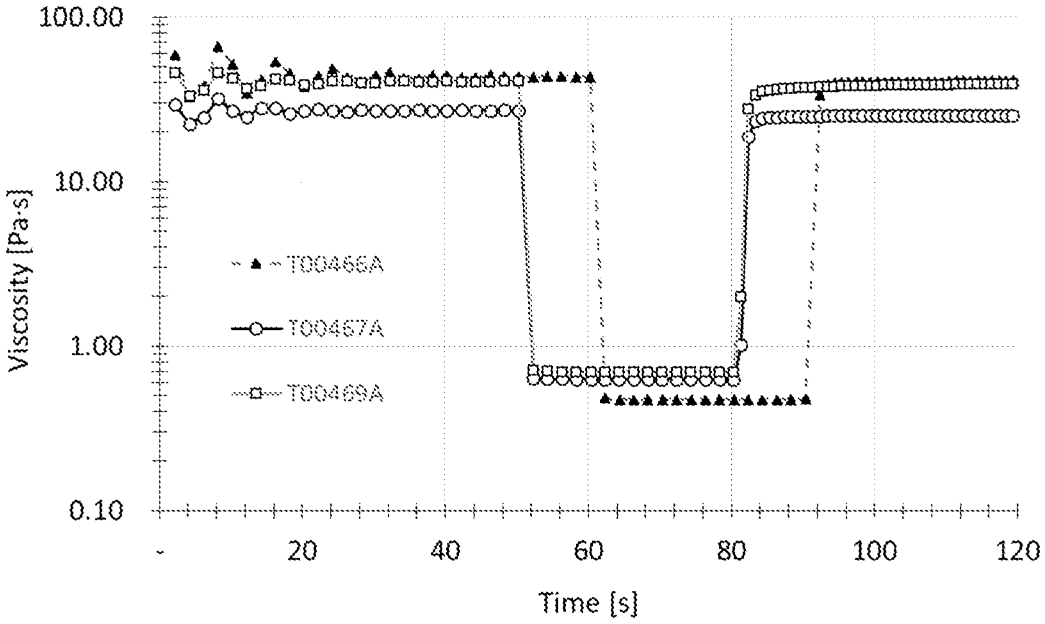
FIG. 2 depicts thixotropic behaviour of the aqueous pseudoplastic gel compositions of FIG. 1.

A thixotropy test was performed by subsequently applying three shear rate regimes and by measuring the viscosity as a function of time. In a first regime, a shear rate of 0.1 $s^{-1}$ was applied during between about 50 and 60 seconds and the viscosity was measured at a sampling interval of 2 seconds. In the second regime, the shear rate was increased to 100 $s^{-1}$ and the viscosity was measured during 30 seconds at a sampling interval of 2 seconds. In a third regime, the shear rate was decreased to 0.1 $s^{-1}$ and the viscosity was measured during at least 40 seconds at a sampling interval of 1 second. FIG. 2 depicts the thixotropic behaviour of the three aqueous pseudoplastic gel compositions of Example 1. As can be inferred from FIG. 2, the aqueous pseudoplastic gel compositions all recover at least 50% of the viscosity measured in the first regime within a few seconds from the start of the third regime. Moreover, the aqueous pseudoplastic gel compositions are able to regain about 100% of the value of the viscosity of the first regime.

Figure 3:
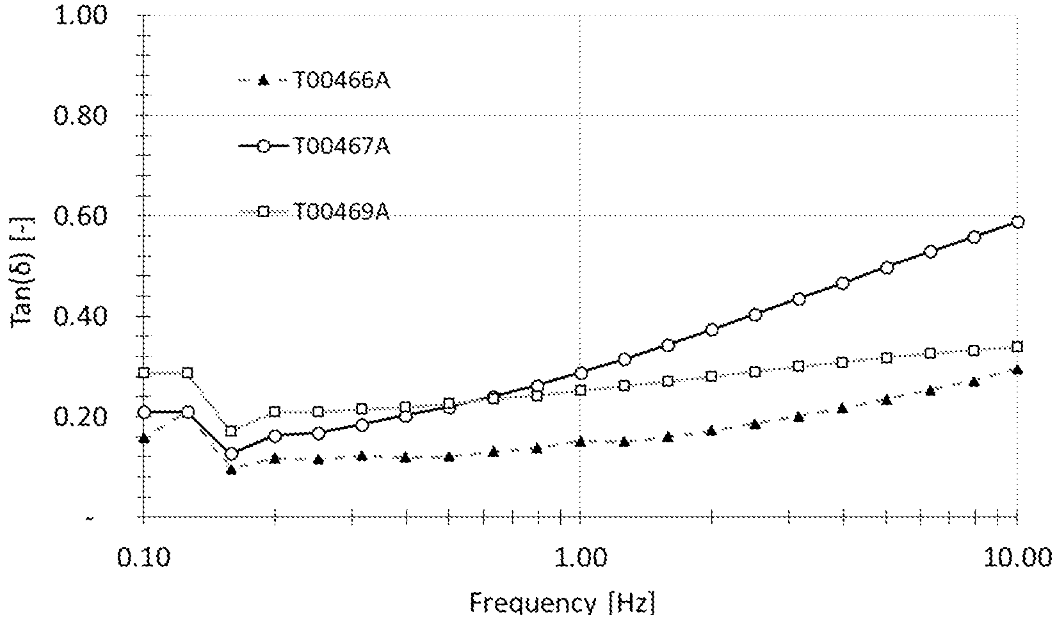
FIG. 3 depicts tan(δ) profiles as a function of oscillatory frequency of aqueous pseudoplastic gel compositions as used in the process according to the invention.

In addition, frequency sweep tests were performed to evaluate the viscoelastic behaviour of four of the aqueous pseudoplastic gel compositions. Loss modulus G", storage modulus G' and tan($\delta$) were measured at suitable shear strains in the linear viscoelastic range and at oscillatory frequencies varying between 10 Hz and 0.1 Hz with 10 samples per decade. Results are presented in FIG. 3. The tan($\delta$) values are all below 1 across the range of oscillatory frequencies, indicating gel-like behaviour in the sense that elastic behaviour dominates viscous behaviour.

Example 4

The three aqueous pseudoplastic gel compositions of Example 1 were used in the preparation of six different compositions selected from the group consisting of aqueous pastes, inks, paints or coating formulations with retroreflective properties.

The three aqueous pseudoplastic gel compositions of Example 1 were mixed with several commercial products listed in Table 3. The viscosity $\eta_1$ of the commercial products measured at a shear rate of 0.01 $s^{-1}$ with a rheometer with a plate-plate geometry and a gap distance of 0.5 mm at a temperature of 25° C. is also shown in Table 3.

TABLE 3

| Composition | Offered by | Purpose | Viscosity [Pa · s] |
|---|---|---|---|
| Permaset Aqua Print Paste G11-0072 | Colormaker Industries | Textile screen printing ink | ~610 |
| 80.5110 Aquasafe R/S | Polytex Environmental Inks BV | wallpaper ink base | ~0.3 |
| Ceta Bever ® Schuur & Tuinhuis Beits, Blank Transparant Zijdeglans | Akzo Nobel | water-borne stain | ~1 |
| THU Wallpaper | Som Wallcoverings Turkey | wallpaper ink base | ~4 |

TABLE 3-continued

| Composition | Offered by | Purpose | Viscosity [Pa · s] |
|---|---|---|---|
| Glitsa ® Normaal Gebruik Parketlak Kleurloos | Akzo Nobel | water-borne parquet varnish | ~1.5 |

When needed, additional thickener (chosen from the thickeners listed in Example 1) was added.

Mixing was performed as follows. The commercial aqueous paste, ink, paint or coating formulation was put in a beaker. The aqueous pseudoplastic gel composition was subsequently added, followed by thorough mixing with a Dispermill Orange-line 18/186 at 2000 rpm during 10 minutes. In a next step, additional thickerer was added followed again by thorough mixing with a Dispermill Orange-line 18/186 at 3400 rpm during 10 minutes. The whole process was performed at ambient temperature (~20° C.).

The amounts of the different ingredients in the resulting compositions are listed in Table 4.

TABLE 4

| | Sample | | | | | |
|---|---|---|---|---|---|---|
| Ingredients | T00466B amount [wt. %] | T00475 amount [wt. %] | T00467B amount [wt. %] | T00474B amount [wt. %] | T00469B amount [wt. %] | T00476 amount [wt. %] |
| Aqueous pseudoplastic gel composition | | | | | | |
| | T00466A | T00466A | T00467A | T00467A | T00469A | T00469A |
| | 59.10 | 59.93 | 61.24 | 59.43 | 59.23 | 59.59 |
| Commercial aqueous paste, ink, paint or coating formulation | | | | | | |
| Permaset Aqua Print Paste G11-0072 | | 40.07 | | | | |
| 80.5110 Aquasafe R/S | 39.60 | | | | | |
| Ceta Bever ® Schuur & Tuinhuis Beits | | | 37.78 | | | |
| 80.1305 Aquasafe R/S Glittery Silver | | | | 39.86 | | |
| THU Wallpaper | | | | | 39.23 | |
| Glitsa ® Normaal Gebruik Parketlak | | | | | | 39.80 |
| Additional thickener | | | | | | |
| Carbopol ® Aqua SF-1 | | | | | 1.54 | |
| Rheovis ® AS 1152 | 1.30 | | 0.98 | 0.71 | | |
| ACULYN ™ Excel | | | | | | 0.61 |
| Total composition | 100.00 | 100.00 | 100.00 | 100.00 | 100.00 | 100.00 |

The stability of the six different compositions selected from the group consisting of aqueous pastes, inks, paints or coating formulations with retroreflective was determined by visual and tactile inspection of whether the sample shows sedimentation, syneresis or separation (phase or otherwise). A composition is considered stable if upon visual and tactile inspection no sedimentation, no syneresis and no separation can be observed. The amount of spherical glass beads in the different compositions, the pH directly following synthesis and the stability thereafter are listed in Table 5.

TABLE 5

| Sample | T00466B | T00475 | T00467B | T00474B | T00469B | T00476 |
|---|---|---|---|---|---|---|
| Amount SFX 2.2 (wt. %) | 37.24 | 37.75 | 38.29 | 37.16 | 37.32 | 37.55 |
| pH | 9.15 | 9.6 | 8.05 | 8.81 | 8.38 | 9.25 |
| Stability | >13 days | >5 days | >13 days | >5 days | >12 days | >5 days |
| Homogeneity | homogeneous | homogeneous | homogeneous | homogeneous | homogeneous | homogeneous |

Example 6

Composition T00469B was applied to wallpaper using spray coating. Retroreflective wallpaper was obtained with visually appealing properties.

Composition T00475 was applied to textile using screen printing. A visually appealing printed textile product with retroreflective properties was obtained.

Composition T00466B was applied to wallpaper using screen printing. A visually appealing printed wallpaper with retroreflective properties was obtained.

Comparative Example

Five comparative retroreflective compositions were prepared by directly mixing compositions selected from the group consisting of aqueous pastes, inks, paints or coating formulations (as defined in Example 4) with spherical glass beads (SFX 2.2). The comparative retroreflective compositions were prepared as follows. The commercial aqueous paste, ink, paint or coating formulation was put in a beaker. The spherical glass beads were subsequently added, followed by thorough mixing with a Dispermill Orange-line 18/186 at 2000 rpm during 10 minutes. The process was performed at ambient temperature (~20° C.). The amounts of the different ingredients in the resulting comparative compositions are listed in Table 6.

TABLE 6

| Sample | T00448-B | T00448-D | T00448-F | T00448-N | T00448-R |
|---|---|---|---|---|---|
| Ingredients | amount [wt. %] | amount [wt. %] | amount [wt. %] | amount [wt. %] | amount [wt. %] |
| Spherical glass beads | | | | | |
| SFX 2.2 | 47.91 | 48.38 | 48.20 | 47.86 | 48.06 |
| Commercial aqueous paste, ink, paint or coating formulation | | | | | |
| Permaset Aqua Print Paste G11-0072 | | 51.62 | | | |
| 80.5110 Aquasafe R/S | 52.09 | | | | |
| Ceta Bever ® Schuur & Tuinhuis Beits | | | 51.80 | | |
| 80.1305 Aquasafe R/S | | | | 52.14 | |
| Glittery Silver THU Wallpaper | | | | | 51.94 |
| Total composition | 100.00 | 100.00 | 100.00 | 100.00 | 100.00 |

The stability of the five comparative compositions was determined by visual and tactile inspection of whether the sample shows sedimentation, syneresis or separation (phase or otherwise) moreover, it was determined whether the sample remains homogeneous. The pH directly following synthesis, and the stability and homogeneity thereafter are listed in Table 7.

TABLE 7

| Sample | T00448-B | T00448-D | T00448-F | T00448-N | T00448-R |
|---|---|---|---|---|---|
| pH | 8.27 | 8.09 | 7.39 | 7.95 | 8.12 |
| Stability | not stable | stable | not stable | stable | not stable |
| Homogeneity | | non-homogeneous/ air bubbles | | non-homogeneous/ air bubbles | |

The invention claimed is:

1. A method for providing a composition selected from the group consisting of aqueous pastes, inks, paints and coating formulations with retroreflective properties, said method comprising the steps of:

a) providing an aqueous paste, ink, paint or coating formulation without retroreflective properties, said aqueous paste, ink, paint or coating formulation having a viscosity $\eta_1$ of between 0.25 and 1000 Pa·s at a shear rate of 0.01 $s^{-1}$;

b) providing an aqueous pseudoplastic gel composition having a first viscosity $\eta_2$ at a shear rate of 0.01 $s^{-1}$ of between 5 and 250 Pa·s and a second viscosity $\eta_3$ at a shear rate of 100 $s^{-1}$ that is between 10 and 1000 times lower than the first viscosity $\eta_2$, wherein the aqueous pseudoplastic gel composition consists of, based on the total weight of the aqueous pseudoplastic gel composition:

15-39.85 wt. % of water;

60-80 wt. % of spherical glass beads having a median particle diameter D50, as measured with laser diffraction, between 5 and 1500 μm, and a refractive index, measured at a wavelength λ of 589 nm, between 1.8 and 2.8, wherein optionally at least part of the spherical glass beads are hemispherically coated with a light-reflective coating;

0.15-2.5 wt. % of a thickener; and 0-5 wt. % of one or more further ingredients;

c) admixing the aqueous paste, ink, paint or coating formulation provided in step (a) with the aqueous pseudoplastic gel composition provided in step (b) in a weight ratio of between 30:70 to 70:30; and d) admixing the mixture obtained in step (c) with 0-2 wt. %, based on the total weight of the aqueous paste, ink, paint or coating formulation with retroreflective properties, of a thickener, to provide an aqueous paste, ink, paint or coating formulation with retroreflective properties, wherein the viscosities $\eta_1$, $\eta_2$ and $\eta_3$ are measured with a rheometer with a plate-plate geometry and a gap distance of 0.5 mm at a temperature of 25° C.

2. The method according to claim 1, wherein the aqueous pseudoplastic gel composition provided in step (b) has a third viscosity $\eta_4$ at a shear rate of 0.1 $s^{-1}$, wherein the aqueous pseudoplastic gel composition regains at least 20% of the value of the third viscosity $\eta_4$ within 10 s from the reduction of the shear rate in step (iii) of the following process comprising the consecutive steps of:

(i) subjecting the aqueous pseudoplastic gel composition to a shear rate of 0.1 $s^{-1}$ for at least 30 seconds and measuring the third viscosity $\eta_4$;

(ii) subjecting the aqueous pseudoplastic gel composition to a shear rate of 100 $s^{-1}$ for 30 seconds;

(iii) reducing the shear rate to 0.1 $s^{-1}$; and (iv) measuring the viscosity of the aqueous pseudoplastic gel composition as a function of time.

3. The method according to claim 1, wherein the aqueous pseudoplastic gel composition provided in step (b) has tan(δ) values, measured with a rheometer with a plate-plate geometry and a gap distance of 0.5 mm at a temperature of 25° C., at oscillatory frequencies between 10 and 0.1 Hz, that are lower than 1.

4. The method according to claim 1, wherein the spherical glass beads in the aqueous pseudoplastic gel composition provided in step (b) have a refractive index, measured at a wavelength λ of 589 nm, between 1.9 and 2.6.

5. The method according to claim 1, wherein the aqueous pseudoplastic gel composition provided in step (b) comprises 0.20-2.45 wt. %, based on the total weight of the aqueous pseudoplastic gel composition, of the thickener.

6. The method according to claim 1, wherein the thickener in the aqueous pseudoplastic gel composition provided in step (b) is chosen from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, modified urea or urea-modified polyamides, and combinations thereof.

7. The method according to claim 1, wherein the aqueous paste, ink, paint or coating formulation with retroreflective properties obtained in step (d) is stable and homogeneous for at least 1 day, wherein the composition is considered stable and homogeneous if upon visual and tactile inspection no sedimentation, no syneresis and no separation can be observed and wherein upon inspection with a microscopic camera, no air inclusion can be visually observed.

8. The method according to claim 1, wherein steps (c) and (d) are performed at a temperature between 15 and 30° C.

9. The method according to claim 1, wherein in step (c), the aqueous paste, ink, paint or coating formulation provided in step (a) is admixed with the aqueous pseudoplastic gel composition provided in step (b) in a weight ratio of between 40:60 to 60:40.

10. The method according to claim 1, wherein in step (d) the mixture obtained in step (c) is admixed with 0-1.9 wt. %, 0-1.8 wt. %, 0-1.7 wt. %, 0-1.6 wt. %, 0-1.5 wt. %, 0-1.4 wt. %, or 0-1.3 wt. %, based on the total weight of the aqueous paste, ink, paint or coating formulation with retroreflective properties, of the thickener.

11. The method according to claim 1, wherein in step (d) the mixture obtained in step (c) is admixed with 0.1-2.0 wt. %, 0.2-2.0 wt. %, 0.3-2.0 wt. %, 0.4-2.0 wt. %, or 0.5-2.0 wt. %, based on the total weight of the aqueous paste, ink, paint or coating formulation with retroreflective properties, of the thickener.

12. The method according to claim 1, further comprising the step of applying the aqueous paste, ink, paint, or coating formulation with retroreflective properties obtained in step (d) to a substrate using screen printing, spray coating or spray painting.

13. The method according to claim 1, wherein the aqueous pseudoplastic gel composition as provided in step (b) is prepared using a process comprising the steps of:

(A) adding water, the spherical glass beads, the thickener and the optional one or more further ingredients to a container;

(B) stirring or homogenizing the mixture obtained in step (A); and (C) optionally adjusting the pH prior to or after step (B).

14. The method according to claim 2, wherein the aqueous pseudoplastic gel composition regains at least 50% of the value of the third viscosity $\eta_4$ within 10 s from the reduction of the shear rate in step (iii).

15. The method according to claim 2, wherein the aqueous pseudoplastic gel composition regains at least 20% of the value of the third viscosity $\eta_4$ within 2 s from the reduction of the shear rate in step (iii).

16. The method according to claim 3, wherein the aqueous pseudoplastic gel composition provided in step (b) has tan(δ) values, measured with a rheometer with a plate-plate geometry and a gap distance of 0.5 mm at a temperature of 25° C., at oscillatory frequencies between 10 and 0.1 Hz, that are between 0.1 and 0.8.

17. The method according to claim 4, wherein the spherical glass beads in the aqueous pseudoplastic gel composition provided in step (b) have a refractive index, measured at a wavelength λ of 589 nm, between 1.9 and 2.2.

18. The method according to claim 5, wherein the aqueous pseudoplastic gel composition provided in step (b) comprises 0.75-2.10 wt. %, based on the total weight of the aqueous pseudoplastic gel composition, of the thickener.

19. The method according to claim 9, wherein in step (c), the aqueous paste, ink, paint, or coating formulation provided in step (a) is admixed with the aqueous pseudoplastic gel composition provided in step (b) in a weight ratio of between 45:55 to 55:45.

20. The method according to claim 13, wherein the stirring or homogenizing of step (B) is carried out at a temperature between 15 and 30° C., for a period of between 5 and 15 minutes.

* * * * *